INVENTORS.
WALTER GIGER, JR.,
FRANK C. JOHNSTON

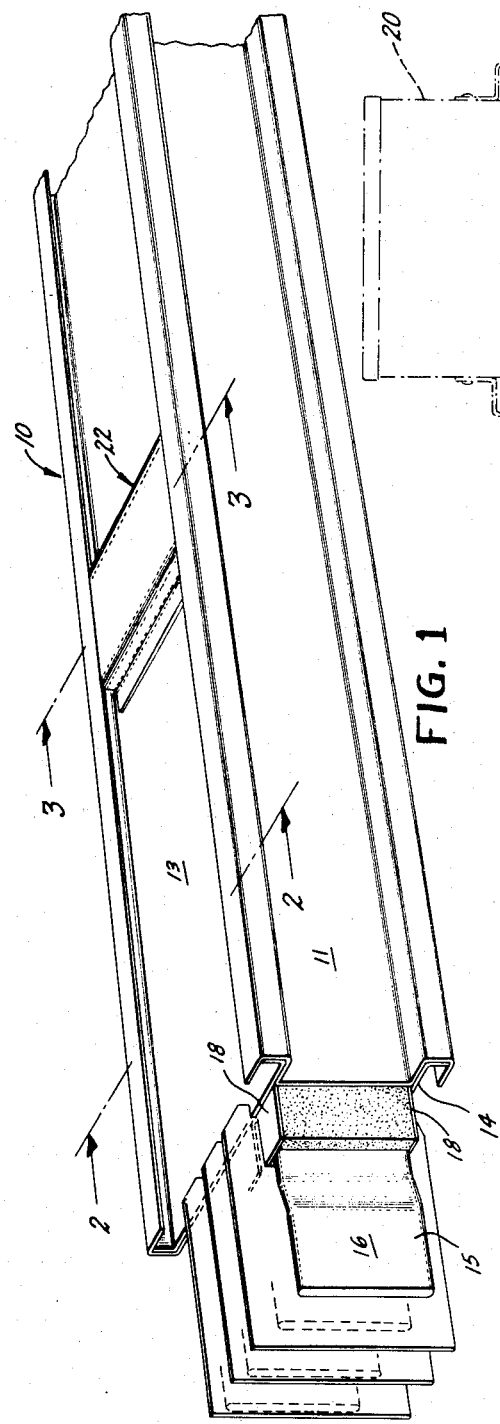

BY Arthur E. Trumies Jr.

ATTORNEY

United States Patent Office 3,439,309
Patented Apr. 15, 1969

3,439,309
PLUG-IN TYPE ELECTRICAL POWER DISTRIBUTION SYSTEM
Walter Giger, Jr., Wethersfield, and Frank C. Johnston, West Hartford, Conn., assignors to General Electric Company, a corporation of New York
Filed May 31, 1967, Ser. No. 642,580
Int. Cl. H01r 13/60
U.S. Cl. 339—22                     4 Claims

ABSTRACT OF THE DISCLOSURE

An electrical power distribution system comprising an elongated metallic duct having a plurality of spaced electrical conductors therein, the space between the individual conductors and between the conductors and the side walls of the duct being substantially completely filled with a homogeneous, non-hygroscopic, electrically insulating cellular material.

BACKGROUND OF THE INVENTION

*Field of invention*

Our invention relates to electrical power distribution systems of the enclosed bus bar type, commonly referred to as "busways," and more particularly to such busways of the type in which the bus bars are spaced from each other in order to permit the use of plug-in type power take-off devices therewith.

*Description of prior art*

It is an important consideration in the manufacture of a busway to see that the individual bus bars housed in the busway are adequately supported as protection against the high magnetic forces to which the bars may be subjected as a result of short-circuit currents. These magnetic forces tend to bend the bars, and/or distort them, sometimes to the extent of causing them to touch the busway housing.

To provide the required support, the prior art has generally relied on the use of insulation blocks positioned at spaced locations along the busway. These blocks may for example be of the type shown in U.S. Patent 2,868,864 issued to R. G. Page on Jan. 13, 1959 and assigned to the same assignee as the present invention. A serious disadvantage in the use of such insulator blocks is that they do not provide support for the bus bars along the entire length of the busway, and as a consequence the bars are free to bend, distort, etc. in between the insulator blocks. Another disadvantage is that the insulator blocks are susceptible to breakage, both during handling and installation of busway sections and under short-circuit magnetic forces. On the other hand, to utilize insulator blocks along the entire length of the busway would not be feasible from the standpoint of expense, as well as from the fact that this would increase considerably the weight of the busway. With respect to weight, one must bear in mind that busways are often installed in elevated locations such as along the ceiling of a building.

Another source of difficulty with prior art busways has been the entrance or condensation of moisture therein, creating the possibility of over-surface electrical breakdown. One approach which has been tried in an effort to limit the entrance of moisture into the busway housing has involved the use of a resilient plastic rubbery material such as vinyl plastisol to completely fill the cross-section of the housing for short distances. However, this only prevents the accumulation of moisture in those areas occupied by the plastisol and does not inhibit the formation of corrosion caused by condensation of air present in the rest of the busway. Other approaches which have had limited applicability involve modifying the busway housing in a variety of ways to fill specific needs. Such modifications of course increase the cost of the busway, normally are provided only on special orders, and generally require the busway to be installed in a particular manner, thereby complicating the installation of the busway.

In the past substantial lengths of busway have been destroyed by arcs which occur at one point in the busway and travel along the length of the busway, in a direction away from the source of voltage. To meet this problem, the prior art has in general merely relied on the spaced insulator blocks previously referred to to serve as a sort of "fire stop." However, the arc is free to travel along the busway until it encounters one of the blocks, therefore the possibility of substantial damage to the busway still exists. On the other hand, to increase the number of insulator blocks per given length of busway would be prohibitive from the standpoint of cost.

SUMMARY OF THE INVENTION

It is an object of the present invention to provide an electric power busway having means supporting spaced bus bars all along their length, which means is relatively light, inexpensive, and which is non-hygroscopic.

It is another object of the present invention to provide such an electric power busway including means for preventing condensation inside the housing, and also means for sealing the cracks between adjoining side walls of the housing against entry of moisture and which, if moisture does enter, will prevent the travel of the moisture along the housing.

It is a still further object of the present invention to provide an electric power busway having means for preventing travel of arcs away from the point of creation no matter where they may be created in the busway. Another object of the present invention is to provide an electric power busway including insulating and supporting means for spaced bus bars which does not require expensive molds for fabrication, or the stocking and handling of a variety of differently shaped insulating pieces for assembly.

In accordance with the present invention, there is provided a plug-in type electrical power distribution system of the enclosed bus bar type comprising prefabricated longitudinal sections. Each of these sections includes a metallic housing or duct having therein a plurality of bus bars in spaced relation. Insulating means substantially completely fills the interior of the duct, including the spaces between the bus bars. A plurality of spaced openings are provided in the housing or duct, and the bus bars have portions thereof adjacent each of these openings exposed for contact by plug-in type power take-off devices.

In accordance with the invention in one form, there is provided a plug-in type electrical power distribution system comprising a metallic housing or duct having a plurality of spaced outlets therein. A plurality of electrical conductors or bus bars, each having a pair of relatively wide faces and a pair of relatively narrow faces, are supported within the housing. The wide faces thereof are in parallel spaced relation, and the narrow faces are in intimate thermal contact with the housing with only a relatively thin layer of insulation therebetween. Insulating means substantially completely fills the interior of the housing between the wide faces of the bus bars, and between the wide faces of the bus bars and the side walls of the housing.

In accordance with a preferred form of the invention, the insulation referred to comprises "expanded" or cellular plastic insulation having relatively high strength and low weight and low cost per volume unit such, for example, as polyurethane. Such insulation may be created or "foamed" in place in the housing or pre-formed and assembled with the busway.

The invention will be more fully understood by reference to the following detailed description taken in conjunction with the accompanying drawings, and its scope will be pointed out in the appended claims.

BRIEF DESCRIPTION OF THE DRAWINGS

In the drawings:

FIGURE 1 is a perspective view of a portion of a busway section incorporating the present invention;

FIGURE 2 is a cross-sectional view of the busway section of FIGURE 1, taken substantially on the line 2—2 of FIGURE 1;

FIGURE 3 is a cross-sectional view of the busway section of FIGURE 1, taken substantially on the line 3—3 of FIGURE 1, and also showing in phantom lines a plug-in type power take-off device;

DESCRIPTION OF THE PREFERRED EMBODIMENT

Figure 4:
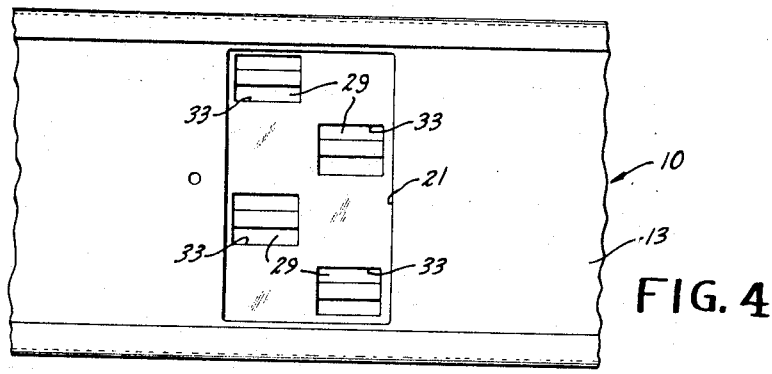
FIGURE 4 is a plan view of a portion of a busway section incorporating the invention and showing a busway outlet with the cover removed.

Referring now to FIGURE 1, there is shown therein a portion of a section of busway constructed in accordance with the present invention. The busway section includes a metallic housing 10 comprising a pair of side plates 11 and 12, and top and bottom plates 13 and 14, respectively.

A plurality of bus bar conductors 15 are enclosed within the housing 10. Each of the bus bar conductors 15, as best seen in FIGURES 2 and 3, has a pair of relatively wide faces 16, and a pair of relatively narrow faces 17. The narrow faces 17, although in intimate thermal contact with the inner surfaces of the top and bottom plates 13 and 14, respectively, are electrically insulated therefrom by means of a pair of strips 18 of suitable relatively thin, tough insulation material, such as for example polyethylene terephthalate. One of these strips 18 of insulation material is positioned between the inner surface of the top plate 13 and the narrow faces 17 of the bus bar conductors, and the other between the bottom plate 14 and the narrow faces 17. Each of these strips 18 of insulation material extends the entire length of the section of busway.

The bus bar conductors 15 are supported within the housing 10 with the wide faces 16 thereof in parallel spaced relation to each other and to the side plates 11 and 12. The spacing D between the wide faces 16 of the bus bar conductors, as best seen in FIGURE 3, corresponds to the distance D which exists between the "clothespin" type plug-in stabs 19 of a plug-in type power take-off device 20.

In order to provide access to the bus bar conductors 15 enclosed within the housing 10, one or more outlets are provided in the top and bottom plates 13 and 14, respectively, which are capable of accommodating a plug-in type power take-off device 20. One such outlet is shown in FIGURE 4. When not being used, the outlet 21 is preferably closed by means of an outlet cover 22, as shown for example in FIGURE 1. It may further be seen with reference to FIGURE 4, that suitable cut-outs 33 are provided in the insulating strip 18 for the purpose of permitting the passage therethrough of the plug-in stabs 19.

Referring now to FIGURE 2, in accordance with the invention, all space within the housing 10 not occupied by the bus bar conductors 15 is substantially completely filled by insulation material 23. The material used for this purpose in the preferred embodiment is a suitable plastic material such as polyurethane which has been expanded by means of a foaming or blowing agent, and then allowed to harden into a multi-cellular or foam-like solid. This material maintains the bus bar conductors in properly spaced relation, and also serves to insulate bus bar conductors from each other and from the metallic housing 10. The term "homogeneous cellular plastic electrical insulating material" as used herein means a material having a generally uniform coherent structure throughout, with a multiplicity of air chambers or cells, whether or not such cells are inter-communicating, such materials being generally designated in the trade as "expanded" or "foamed" plastics. The term "foam-like expanded plastic insulation material" as used herein means a plastic material which has been formed by treating a liquid material with a foaming or blowing agent to expand it and then allowing it to harden into a multi-cellular or foam-like solid.

Preferably the insulation material 23 substantially completely fills the space existing between each of the bus bar conductors 15, and also between the conductors and the metallic housing 10 for the entire length of the busway section. During the hardening process, the material bonds or adheres to the bus bar conductors and also to the busway housing. This increases the short-circuit strength of the busway since such hardening further impedes relative motion between the bars and between the bars and the housing. A further advantage derived from this type of material is that it aids greatly in excluding moisture from the interior of the busway housing. Thus, moisture which would normally result from the condensation of air therein is eliminated since practically the entire space within the housing is filled not by air but rather by either the cellular non-hygroscopic insulation material 23 or the bus bar conductors 15.

In addition, in the preferred form of the invention, the insulation material is "foamed in place" and is chosen so as not only to fill the available space but also to exert a slight positive pressure therein. This causes it to force itself into all available cracks and other small openings before hardening providing an excellent seal against the entrance of moisture.

In practice, in filling a section of busway with expandable plastic insulation material 23, the latter is normally introduced therein in liquid form. Suitable closing members (not shown) are positioned temporarily at each end of the busway section to prevent the escape of the insulation material 23 while in its liquid form. These members are removed when the insulation material has hardened.

Figure 6:
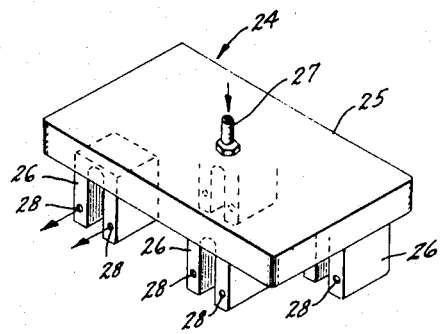
FIGURE 6 is a perspective view of a type of mold used to form the insulation at a busway outlet in accordance with the present invention.

A mold 24, shown in FIGURE 6, is temporarily positioned at each busway outlet 21 in the busway housing 10. This mold has a rectangular surface 25 which has the same configuration as that of the busway outlets. Depending therefrom, there are provided a plurality of U-shaped members 26, one being provided for each of the bus bar conductors 15. When positioned at a busway outlet, the U-shaped members 26 each straddle one of the bus bar conductors.

At least one of the molds 24 is further provided with an inlet opening 27 through which the liquid insulation material 23 may be introduced into the interior of the busway housing 10. From the inlet 27, the insulation material 23 flows through suitable passages (not shown) provided in the rectangular surface 25, and exits through openings 28 provided in each of the U-shaped members 26.

Because the bus bar conductors 15 extend from the top plate 13 to the bottom plate 14, they in effect divide the interior of the busway housing 10 into a series of non-intercommunicating compartments. It is thus necessary to provide a means of introducing the liquid insulation material into each of these compartments. The exit openings 28 in the U-shaped members 26 provide such a means inasmuch as at least one of these openings is provided on each side of a bus bar conductor when the U-shaped members 26 are positioned thereon. To ensure an adequate flow of liquid insulation material into each of the compartments, the mold 24 may be provided with a plurality of inlet openings 27, the number thereof corresponding to the number of U-shaped members 26. Each of the openings 27 is thus linked directly to only one U-shaped member 26, thereby permitting a more accurate control over the quantity of insulation material entering the busway housing.

The second function performed by the mold 24 is that by virtue of the fact that the U-shaped members 26 straddle the bus bar conductors, the insulation material 23 does not flow into those areas immediately adjacent the bus bar conductors, which are occupied by the U-shaped members 26. Thus, as shown in FIGURE 3 when the mold 24 is removed from the busway outlet 21 after the insulation material 23 has hardened in place, there are provided areas 29 which are devoid of insulation. These open areas provide a means whereby the plug-in stabs 19 of the plug-in type power take-off device 20 may engage portions of the bus bar conductors 15.

As an alternative to introducing the liquid insulation material 23 into the housing interior through an inlet opening 27, a series of openings (not shown) may be provided in the top and bottom plates 13, 14, respectively, for this purpose. These openings are preferably suitably located so that at least one opening communicates with each of the compartments between the bus bar conductors 15 and the housing side plates, and between adjacent bus bar conductors. The molds 24 are still utilized to form the uninsulated areas 29 immediately adjacent the bus bar conductors 15 at the busway outlets 21.

Figure 7:
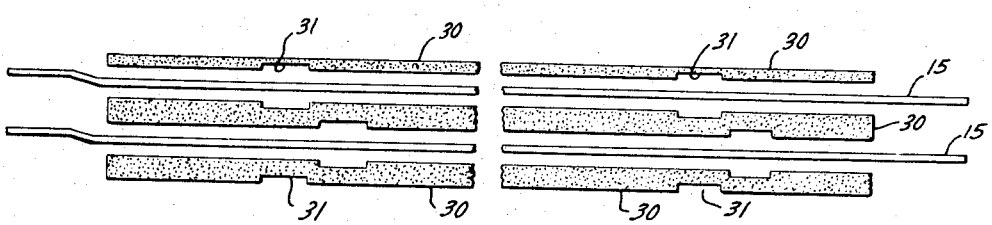
FIGURE 7 is a sectional view of another embodiment of the invention.

Although in the preferred embodiment, the insulation material 23 is introduced into the busway housing in liquid form, the use of pre-formed blocks or strips 30 of expandable foamed material is also contemplated within the scope of the present invention. Thus, as shown in FIGURE 7, blocks of foam insulation material 23 may be inserted between the bus bar conductors 15 and the busway housing, and between adjacent bus bar conductors. Before assembly in the busway housing, each of these blocks 30 is cut to the desired length, and is also provided with notched portions 31. These notched portions, which correspond to the uninsulated areas 29 shown in FIGURE 3, are provided for the purpose of making plug-in connections on the bus bar conductors with the plug-in stabs 19.

Figure 5:
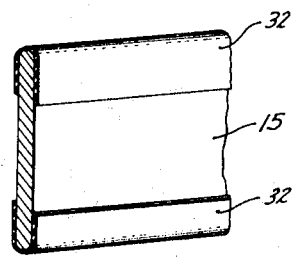
FIGURE 5 is a perspective view of a portion of a bus bar conductor illustrating an alternative method of insulating the narrow faces of the conductor from the busway housing.

FIGURE 5 shows an alternative means of insulating the narrow faces 17 of the bus bar conductors 15 from the inner surfaces of the top and bottom plates 13, 14, respectively, of the busway housing. Thus, in the form shown therein, a pair of C-shaped strips 32 of suitable insulation material, which extend the entire length of each of the bus bar conductors 15, are employed in place of the strips 18 of insulation material. Although not shown, it is to be understood that at the busway outlets 21, the C-shaped insulation material is removed from the edges of the bus bar conductors so as to provide uninsulated portions whereby electrical connections may be made with the plug-in stabs 19.

It will be readily appreciated that many deviations may be made from the specific busway embodiment disclosed without departing from the invention. Thus for example it will be apparent that a greater or lesser number of conductors may be used. Accordingly, it is intended by the appended claims to cover all such modifications as fall within the true spirit and scope of the invention.

What we claim as new and desire to secure by Letters Patent of the United States is:

1. A plug-in type power distribution system of the enclosed bus bar type comprising prefabricated longitudinal sections, each section comprising:
   (a) an elongated rigid metallic duct;
   (b) a plurality of elongated bus bars supported in spaced relation in said duct;
   (c) insulating means substantially completely filling the space in said duct not occupied by said bus bars, including the spaces between said bus bars, said insulating means comprising a homogeneous, non-hygroscopic, cellular plastic electrical insulating material; and
   (d) said duct having a plurality of spaced openings therein and said bus bars having portions thereof adjacent said openings exposed for contact by plug-in type power take-off devices.

2. A plug-in type power distribution system section of the enclosed bus bar type comprising:
   (a) an elongated rigid metallic duct;
   (b) a plurality of elongated electrical bus bars having a pair of relatively wide faces and a pair of relatively narrow faces;
   (c) said plurality of elongated electrical bus bars being supported within said elongated duct with said relatively wide faces thereof in parallel spaced relation to each other and to said duct, and with said relatively narrow faces in intimate thermal contact with said duct;
   (d) insulating means substantially completely filling the length of said elongated duct between said elongated electrical bus bars, and between said bus bars and said duct;
   (e) said duct having a plurality of spaced openings therein and said bus bars having portions thereof adjacent said openings exposed for contact by plug-in type power take-off devices; and
   (f) said insulating means comprising a homogeneous, non-hygroscopic, cellular plastic electrical insulating material.

3. A prefabricated electrical power distribution system section comprising:
   (a) an elongated rigid metallic housing of generally rectangular cross-section;
   (b) a plurality of elongated electrical conductors having a pair of relatively wide faces and a pair of relatively narrow faces;
   (c) said plurality of elongated electrical conductors being supported within said elongated housing with said relatively wide faces thereof in parallel spaced relation to each other and to said housing, and with said relatively narrow faces in intimate thermal contact with said housing;
   (d) first insulating means extending substantially the length of said elongated housing between said relatively narrow faces and said housing;
   (e) second insulating means comprising a foam-like expanded plastic insulation material substantially completely filling the spaces between said relatively wide faces of each of said elongated electrical conductors, and between said relatively wide faces and said housing; and
   (f) said material extending substantially the entire length of said elongated housing.

4. A prefabricated electrical power distribution system section as set forth in claim 3 wherein said housing has a plurality of spaced openings therein and said electrical conductors have portions thereof adjacent said openings exposed for contact by plug-in type power take-off devices.

References Cited

UNITED STATES PATENTS

| | | |
|---|---|---|
| 1,748,060 | 2/1930 | Burnham. |
| 2,186,377 | 1/1940 | Frank _____ 174—98 X |
| 3,018,320 | 1/1962 | Rowe. |

FOREIGN PATENTS 1,240,550  8/1960  France.

LARAMIE E. ASKIN, *Primary Examiner.*

U.S. Cl. X.R.

174—68, 98